(12) United States Patent
Wang et al.

(10) Patent No.: US 11,044,286 B2
(45) Date of Patent: Jun. 22, 2021

(54) INFORMATION EXCHANGE METHOD AND TERMINAL

(71) Applicant: HUAWEI TECHNOLOGIES CO., LTD., Guangdong (CN)

(72) Inventors: Shaolei Wang, Shenzhen (CN); Ren Li, Shenzhen (CN); Yuanfeng Chu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/692,364

(22) Filed: Nov. 22, 2019

(65) Prior Publication Data

US 2020/0092341 A1    Mar. 19, 2020

Related U.S. Application Data

(63) Continuation of application No. PCT/CN2017/117766, filed on Dec. 21, 2017.

(30) Foreign Application Priority Data

May 23, 2017 (CN) .......................... 201710368097.5

(51) Int. Cl.
*H04L 12/58* (2006.01)
*H04L 29/06* (2006.01)
(Continued)

(52) U.S. Cl.
CPC ............ *H04L 65/403* (2013.01); *H04L 51/16* (2013.01); *H04L 51/32* (2013.01);
(Continued)

(58) Field of Classification Search
CPC ... H04L 65/403; H04L 65/1069; H04L 51/16; H04L 51/32; H04L 67/03; H04L 65/1093; G06F 17/2785; G06F 3/0482
(Continued)

(56) References Cited

U.S. PATENT DOCUMENTS

| 5,694,544 A | 12/1997 | Tanigawa et al. |
| 2007/0195008 A1 | 8/2007 | Ueno et al. |

(Continued)

FOREIGN PATENT DOCUMENTS

| CN | 101026733 A | 8/2007 |
| CN | 101689365 A | 3/2010 |

(Continued)

*Primary Examiner* — Glenford J Madamba
(74) *Attorney, Agent, or Firm* — Womble Bond Dickinson (US) LLP

(57) ABSTRACT

This application relates to the communications field, and discloses an information exchange method and a terminal. The method includes: determining target content in a current interface according to an operation instruction entered by a topic initiator for the current interface; determining a discussion topic title based on the target content, and setting up a topic discussion group; adding a topic participant to the topic discussion group based on the target content and/or the discussion topic title; and receiving discussion content entered by the topic initiator and/or the topic participant, and displaying the discussion content.

20 Claims, 12 Drawing Sheets

(51) Int. Cl.
*H04L 29/08* (2006.01)
*G06K 9/78* (2006.01)

(52) U.S. Cl.
CPC ........ *H04L 65/1069* (2013.01); *H04L 67/02* (2013.01); *G06K 9/78* (2013.01); *G06K 2209/01* (2013.01)

(58) Field of Classification Search
USPC ........................................................ 709/206
See application file for complete search history.

(56) References Cited

U.S. PATENT DOCUMENTS

| | | |
|---|---|---|
| 2008/0046415 A1 | 2/2008 | Henkin et al. |
| 2010/0188475 A1 | 7/2010 | Le Goff et al. |
| 2010/0246784 A1 | 9/2010 | Frazier et al. |
| 2013/0022955 A1* | 1/2013 | Lang ...................... G06Q 50/20 434/362 |
| 2013/0311906 A1* | 11/2013 | Mackin ................... H04L 51/32 715/758 |
| 2016/0094504 A1 | 3/2016 | Cinar et al. |

FOREIGN PATENT DOCUMENTS

| | | | |
|---|---|---|---|
| CN | 102215178 A | | 10/2011 |
| CN | 103838792 A | | 6/2014 |
| CN | 103856395 A | | 6/2014 |
| CN | 105187288 A | * | 12/2015 |
| CN | 105187288 A | | 12/2015 |
| CN | 107342932 A | | 11/2017 |
| EP | 1868149 A1 | | 12/2007 |
| WO | 2013144626 A1 | | 10/2013 |

* cited by examiner

FIG. 7b

INFORMATION EXCHANGE METHOD AND TERMINAL

CROSS-REFERENCE TO RELATED APPLICATIONS

This application is a continuation of International Application No. PCT/CN2017/117766, filed on Dec. 21, 2017, which claims priority to China Patent 201710368097.5, filed on May 23, 2017. The disclosures of the aforementioned applications are herein incorporated by reference in their entireties.

TECHNICAL FIELD

This application relates to the communications field, and specifically, to an information exchange method and a terminal.

BACKGROUND

A network social technology is shifting from a 'nice-to-have' tool in a workspace to a 'must-have' tool. Faced with an increasing pace of service change and increasing popularization of mobile office and web work, all companies need to leverage a more advanced social technology to maximize mobilization of employee capabilities and knowledge. Just as email accelerated enterprise development in the 1990s, a social network and a social technology are driving faster flow of knowledge and information within and across enterprises. When Adam Pisoni, Microsoft's general manager, talked about information exchange issues that today's enterprise users face, he said recently that the social technology is becoming a new productivity tool, and can more effectively consolidate information held by employees with different salaries across regions and departments.

The network social technology is applied to branches of an enterprise. In the social technology, a social media principle can be applied to a workspace, making it easier for enterprise employees to share files and information with colleagues and collaborate across departments and regions. Unlike the consumer-oriented network social technology, an enterprise social technology provides employees with a secure workspace for sharing, allowing them to share information both inside and outside a company without location constraints.

A social discussion platform is a forum product, for example, a Branch platform. On the platform, a user can initiate a topic discussion, and another user can also apply, on the platform, to participate in the topic discussion and express an opinion on the topic discussion. If a topic initiator considers that an opinion of a topic discussion applicant has reference significance to the topic discussion, the topic initiator accepts the application, and displays the opinion of the user in a topic discussion group. For another example, if a topic discussion is implemented based on a sub-function of chat software, the sub-function needs to rely on a function of the chat software.

However, because the Branch platform uses an invite-review manner for a topic participant, it is unable to quickly find an appropriate topic participant, and real-time performance is relatively poor. In addition, a discussion platform based on a sub-function of chat software needs to rely on resources of the chat software itself, and is presented in a manner of a chat group or group chatting. In this case, a topic initiator needs to select topic participants one by one, and due to a chat manner of chat software, a current discussion topic is unknown if chat content is not viewed for a period of time, resulting in relatively poor communication convenience.

SUMMARY

Embodiments of this application provide an information exchange method and a terminal, so as to resolve the following problems: A topic discussion cannot be initiated in real time, it is complex to add a topic participant, and real-time performance of topic communication is relatively poor.

A first aspect of the embodiments of this application provides an information exchange method. The method includes: first determining target content in a current interface according to an operation instruction entered by a topic initiator for the current interface, that is, obtaining the target content directly or indirectly from the current interface; then, determining a discussion topic title based on the target content, and setting up a topic discussion group; then, adding, to the discussion group based on the target content and/or the discussion topic title, a topic participant in a topic discussion group associated with the target content and/or the discussion topic title, where the association may be, for example, that the topic participant has participated in a similar topic discussion; then, receiving discussion content entered by the topic initiator and/or the topic participant, and displaying the discussion content.

It can be learned that during topic initiation, complex topic initiation setting is not required and it is only required that an operation be performed on the current interface to obtain the target content in the current interface; the discussion topic title can be determined based on the target content, and the topic discussion group can be set up without requiring a complex process of setting up a topic discussion group; and in addition, during adding of a topic participant, a corresponding topic participant is added based on the target content and/or the discussion topic title. Both the generation process and a member addition process are automatically performed by a topic discussion system. Therefore, efficiency in generating a topic discussion group is high, real-time performance of a topic discussion is high, and an operation is easy to perform.

In some embodiments, the determining target content in a current interface according to an operation instruction entered by a topic initiator for the current interface may be: capturing a part of the current interface directly according to the operation instruction; and performing content recognition on the captured part of the current interface to obtain the target content. This manner is easy to operate, and it is convenient to initiate a topic discussion.

In some embodiments, the current interface is a network web interface. In this case, a manner of determining a discussion topic title based on the target content may be: first obtaining a network address of a web interface corresponding to the target content; then performing matching for a keyword in the network address; and if determining that the network address includes a preset first keyword, determining the topic discussion title based on the first keyword.

In some embodiments, a hyperlink area is r configured in a topic discussion interface of the topic discussion group. The hyperlink area is used to store the network address of the web interface, and the network address is further displayed in the hyperlink area. This setting can enable a member of the topic discussion group to quickly view the interface that is existing when the topic initiator performs screen capturing, so as to quickly know a topic discussion.

In some embodiments, a manner of adding a topic participant to the topic discussion group may be: determining, based on the target content, a topic participant who wants to participate in the topic discussion group. Specifically, the manner includes: first determining a second keyword based on the target content; then searching for a historical topic discussion group in which the topic initiator has participated; matching information about the historical topic discussion group with the second keyword; and when finding that the historical topic discussion group has content corresponding to the second keyword, adding a topic participant in the historical topic discussion group to the topic discussion group.

In some embodiments, a manner of adding a topic participant to the topic discussion group may be: adding a topic participant to the topic discussion group based on the discussion topic title. Specifically, the manner includes: first determining a corresponding third keyword based on the discussion topic title; then searching for a historical topic discussion group in which the topic initiator has participated; matching information about the historical topic discussion group with the third keyword; and when the historical topic discussion group has content corresponding to the third keyword, adding a topic participant in the historical topic discussion group to the topic discussion group.

In some embodiments, a manner of adding a topic participant to the topic discussion group may be: adding a topic participant to the topic discussion group based on both the topic discussion title and the target content. Specifically, the manner includes: first determining a second keyword based on the target content; then determining a third keyword based on the discussion topic title; then matching both the second keyword and the third keyword with the historical topic discussion group; and adding, to the topic discussion group, each topic participant in a topic discussion group that matches the second keyword or the third keyword.

In some embodiments, a content presentation area used for displaying the discussion content is configured in the topic discussion interface of the topic discussion group, and a message queue used for storing the discussion content is further configured for the topic discussion group correspondingly. In this case, modification may be further performed on a topic participant in the topic discussion group; and when there is a newly added topic participant in the modified topic discussion group, the newly added topic participant may further view discussion content stored in the message queue in the content presentation area.

In some embodiments, when the discussion content in the message queue is updated, a content update prompt is further sent to all members in the topic discussion group. All the members include the topic initiator and the topic participant. In this way, each member can learn of latest discussion content in a timely manner.

In some embodiments, each topic discussion group is corresponding to an ID, the topic initiator is also corresponding to an ID, a topic discussion group ID and a topic initiator ID are associated with each other, and the topic initiator ID is further associated with a favorites list. The topic initiator ID is obtained through recognition of the topic initiator, and the topic discussion group ID is generated when the topic discussion group is generated. Therefore, the topic discussion group or discussion content entered by a topic participant in the topic discussion group may be further added to the favorites list, so that content in the favorites list can be directly viewed later.

A second aspect of the embodiments of this application further provides an information exchange method. The information exchange method includes: selecting a target topic discussion group from topic discussion groups in which a topic participant has participated, where the topic discussion group is set up by a topic initiator after the topic initiator determines a discussion topic title based on target content in an interface in which the topic initiator initiates the topic discussion; then entering discussion content in a topic discussion interface of the topic discussion group; and further viewing historical discussion content of the topic discussion group.

It can be learned that the topic discussion group is a topic discussion group set up after the topic initiator obtains target content in a current interface by performing an operation on the current interface and generates the discussion topic title based on the target content. Therefore, efficiency in generating the topic discussion group is high, real-time performance of a topic discussion is high, an operation is easy to perform, and it is also very convenient for the topic participant to participate in the topic discussion group.

In some embodiments, the topic discussion interface includes a topic discussion profile area, and the topic discussion profile area mainly displays topic participants, the target content, and the discussion topic title that are of the topic discussion group. Therefore, the target content in the topic discussion profile area may be selected and the target content may be displayed, or any topic participant of the topic participants may be selected and discussion content entered by the topic participant may be displayed. In this way, it is convenient to view discussion content of the topic discussion group.

In some embodiments, a content presentation area is further configured in the topic discussion interface. In term of data storage, a message queue used for storing the discussion content is further configured for the topic discussion group correspondingly. In this case, the viewing historical discussion content of the topic discussion group includes: viewing discussion content in the message queue actually in the content presentation area.

In some embodiments, if the discussion content in the message queue is updated, a content update prompt is sent to both the topic initiator and the topic participants in the topic discussion group, so that the topic initiator and the topic participants in the topic discussion group can learn of latest discussion content in a timely manner.

In some embodiments, a hyperlink area is further configured in the topic discussion interface, the hyperlink area mainly stores a network address, and the network address is a network address of an interface in which the topic initiator initiates a topic discussion. Therefore, the hyperlink area may be further selected to display an interface corresponding to a hyperlink in the hyperlink area.

In some embodiments, the topic discussion group is further corresponding to a topic discussion group ID, the topic participant is further corresponding to a topic participant ID, the topic participant ID is further associated with a favorites list, and the favorites list stores a topic discussion group, or discussion content entered by a topic participant in the topic discussion group. Therefore, the topic discussion group or a topic participant in the topic discussion group may be selected from the favorites list, and discussion content of the topic discussion group or discussion content of the topic participant in the topic discussion group may be viewed.

A third aspect of this application provides a terminal. The terminal includes at least one unit configured to perform the information exchange method according to the first aspect or any implementation of the first aspect.

A fourth aspect of this application provides a terminal. The terminal includes at least one unit configured to perform the information exchange method according to the second aspect or any implementation of the second aspect.

Still another aspect of this application provides a computer readable storage medium. The storage medium stores program code. When the program code is run by a terminal, the computer performs the methods according to the foregoing aspects. The storage medium includes but is not limited to a flash memory, a hard disk drive (hard disk drive, HDD for short), or a solid-state drive (SSD).

Still another aspect of this application provides a computer program product including an instruction. When the computer program product runs on a computer, the computer performs the methods according to the foregoing aspects.

BRIEF DESCRIPTION OF DRAWINGS

FIG. 7b is an embodiment diagram of an information exchange method according to an embodiment of this application;

DESCRIPTION OF EMBODIMENTS

Embodiments of this application provide an information exchange method and a terminal. A topic discussion group is set up in real time according to an operation instruction for a current interface, and a topic participant can be added based on target content and a discussion topic title. Therefore, efficiency in generating a topic discussion group is high, and real-time performance of a topic discussion is high.

To make persons skilled in the art understand the solutions in this application better, the following describes the embodiments of this application with reference to the accompanying drawings in the embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "have" and any other variants mean to cover the non-exclusive inclusion, for example, a process, method, system, product, or device that includes a list of operations or units is not necessarily limited to those operations or units, but may include other operations or units not expressly listed or inherent to such a process, method, product, or device.

According to an invite-review mechanism of a social discussion platform Branch, a user who wants to participate in a topic needs to proactively apply to participate in a discussion. Therefore, a topic initiator cannot quickly find a member suitable for participating in the discussion, and real-time performance of topic discussion participation is relatively poor. For a communications software platform, a discussion function is usually only a sub-function of communications software, and most resources of the communications software platform rely on an architecture of the communications software itself. For example, a topic discussion is also implemented in a manner of group chatting and is relatively functionally limited, members need to be selected one by one when being invited to a group, a member cannot view chat content of the group before participating in the group, a current discussion focus is unknown if content is not viewed for a period of time because the chat content is refreshed relatively quickly, and if it is required that speech content of a member in the group be learned of, a search function needs to be used for search. Due to these characteristics, this manner is not suitable for the topic discussion.

Figure 1:
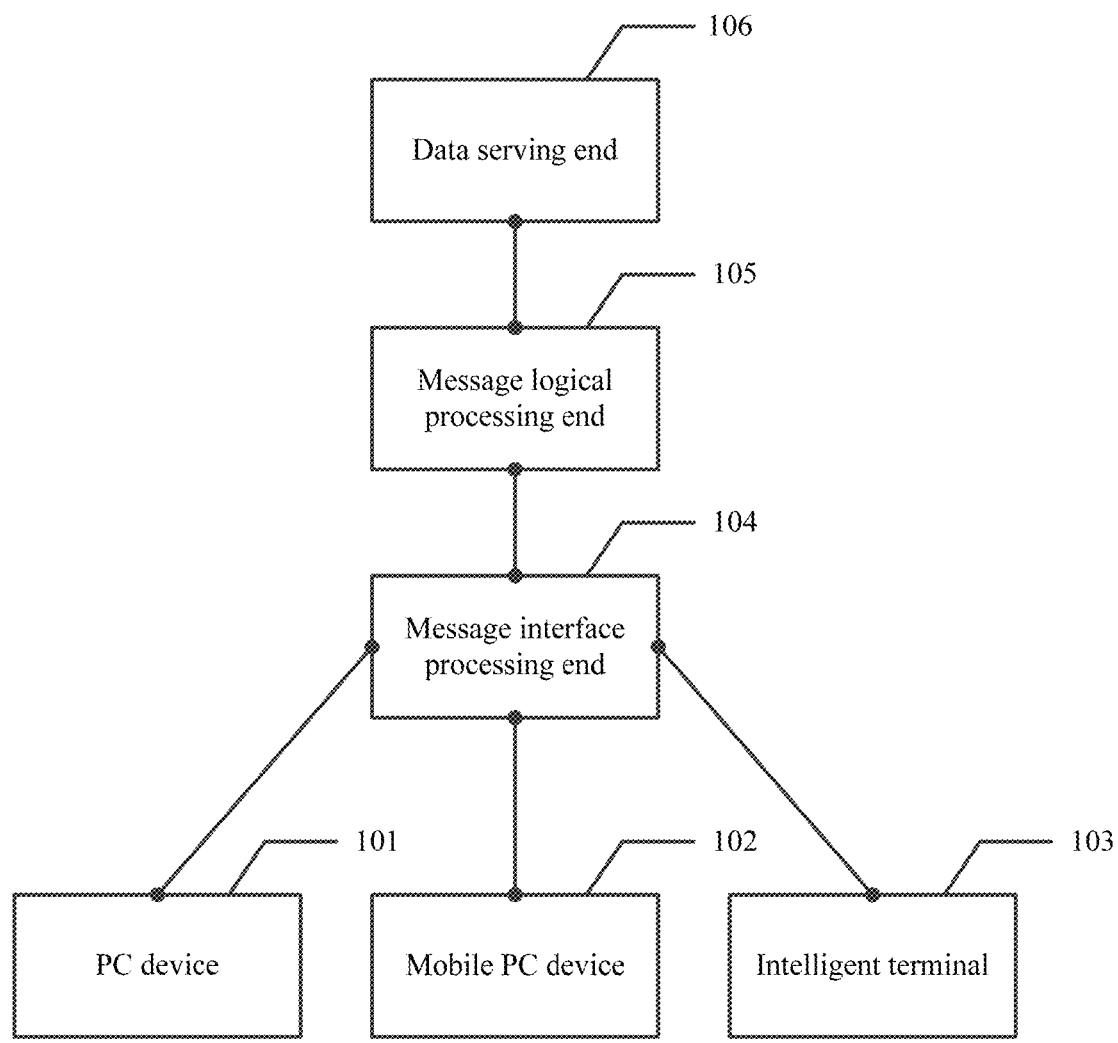
FIG. 1 is a schematic system architecture diagram of an information exchange method according to an embodiment of this application.

In view of this, the embodiments of this application provide an information exchange method and a related device to resolve the foregoing problems. Specifically, FIG. 1 is an embodiment diagram of an information exchange system according to an embodiment of this application. The system includes terminals, a message interface processing end 104, a message logical processing end 105, and a data serving end 106. All the terminals are connected to the message interface processing end 104, the message interface processing end 104 is connected to the message logical processing end 105, and finally the message logical processing end 105 is connected to the data serving end 106.

The terminals in FIG. 1 are a PC device 101, a mobile PC device 102, and an intelligent terminal 103. These terminals are carriers used by a topic initiator for initiating a topic discussion and implementing topic communication. An operation instruction for a current interface of a terminal can be entered by using an input device of the terminal, so that the terminal can determine target content in the current interface according to the operation instruction. It should be noted that the operation instruction may be implemented in a plurality of manners. For example, on the PC device and the mobile PC device, a screen capturing operation may be performed by using a mouse and a keyboard, to select a part of a current interface as target content, or a gesture operation may be simulated by using a mouse, to select partial content in a current interface as target content. For another example, if the terminal is the intelligent terminal, an input device of the intelligent terminal may be an input and output integrated touchscreen, and partial or all content in a current interface can be selected by using a gesture operation performed on the touchscreen, so as to determine target content. It should be noted that in addition to the foregoing three types, the terminal may be of another type, for example, a terminal that is equipped with an operating system, can be connected to the Internet, and has input and display devices, such as a tablet computer and a smartphone. Terminals may use different operating systems and may send a message in different manners. Therefore, the message interface processing end 104 in FIG. 1 is mainly used for interface interaction between the terminals. In other words, a unified interface specification is defined for uniform message processing.

The message logical processing end 105 is mainly configured to perform logical processing on reception and delivery of a message between each terminal and the data serving end 106. For example, the message logical processing end 105 determines that a message is sent by a terminal to the data serving end 106, and determines that the message is sent by the PC device 101. For another example, the message logical processing end 105 determines that a message is sent by the data serving end 106 to a terminal, and determines that the message needs to be sent to the mobile PC device 102.

The data serving end 106 is mainly configured to store content generated by a topic discussion group and content generated during a topic discussion. The content includes two parts. One part is temporary content, that is, content required only during a topic discussion. The other part is persistently stored content. This content may be a discussion topic title, discussion content, a topic initiator ID, a topic participant ID, target content, information about a current interface, and the like. This type of content needs to be read every time the topic discussion group starts a discussion.

It should be noted that data that needs to be persistently stored mainly includes but is not limited to user management information (for example, a user ID and a user name), an online status, a message ID, message content, a favorite information ID (which is used to uniquely identify a favorite message, and may be associated with a same piece of message content together with the message ID), a group ID, a group name (an example of the group name: participate in team requirement design discussion group 001), and the like.

Figure 2:
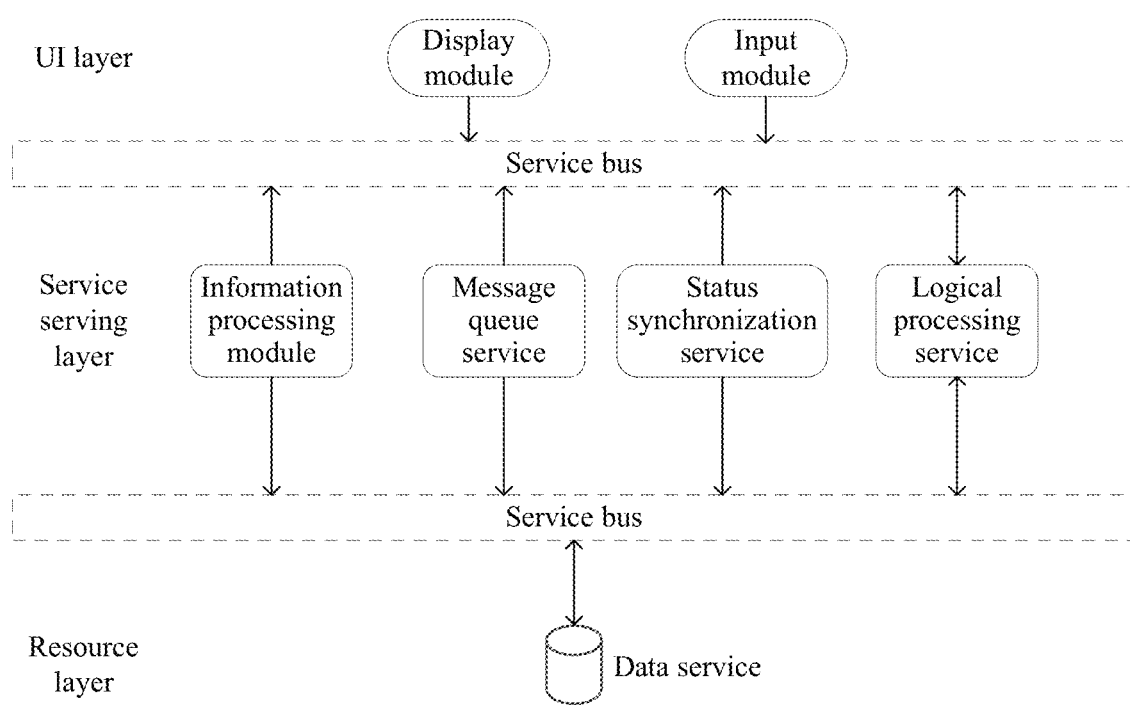
FIG. 2 is a schematic system architecture diagram of an information exchange method according to an embodiment of this application.

FIG. 1 is a schematic system architecture diagram of an information exchange method according to an embodiment of this application. The following describes logical layers of an information exchange system in this embodiment of this application. The information exchange system may be implemented as a social discussion tool in a terminal. FIG. 2 is a schematic system architecture diagram of an information exchange method according to an embodiment of this application. It can be learned that the information exchange system may be divided into three logical layers, namely, an interaction interface UI layer, a service serving layer, and a resource layer.

The UI layer mainly includes a display module and an input module. Corresponding to a function of a terminal in FIG. 1, the UI layer provides an operation interface that a user sees, including a user input and output interface and UI presentation of different services. For a tablet computer and a smartphone, both a display module and an input module are a touchscreen. For other PC and PC-like devices, their input modules are devices such as a mouse, a keyboard, and a touchpad, and their display modules are displays.

The service serving layer is corresponding to the message interface processing end 104 and the message logical processing end 105 in FIG. 1. This part mainly processes a system base service and various service rules, implements service logic, and completes various message-related logical processing, for example, sorting and rich media file preprocessing. An information processing service module is configured to process information reception and delivery of a discussion group and synchronize a message (a historical message and a current message) of the discussion group. A message queue service module temporarily stores a message not successfully sent or an offline message in a message queue. A status synchronization service module synchronizes online status information of all users and information about an online server. A logical processing service module performs logical judgment on data transferred by the information processing service module.

For example, message interaction of a topic discussion group, for example, inputting and receiving discussion content and adding a topic participant to the topic discussion group, certainly further includes a message queue service. Discussion content input by each terminal needs to be queued by using the message queue service. In addition, the service serving layer further has a status synchronization service for synchronizing a status of each terminal, for example, determining a login status of each terminal, namely, determining the terminal is in an online state, a leaving state, an offline state, or another state, so that a topic participant and a topic initiator who are in different statuses are processed in different manners. For example, for an offline topic participant and an offline topic initiator, discussion content generated after they become offline last time is sent to them when they go online next time.

The resource layer is corresponding to the data serving end 106 in FIG. 1, and mainly provides data storage and reading functions, for example, mainly storing a message in a database and a rich media file in a file cache, so that when being displayed for a second time, a message is locally loaded, instead of being obtained from a network layer.

The foregoing describes the information exchange system in the embodiments of this application. The following describes the information exchange method in the embodiments of this application from several different phases.

Figure 3:
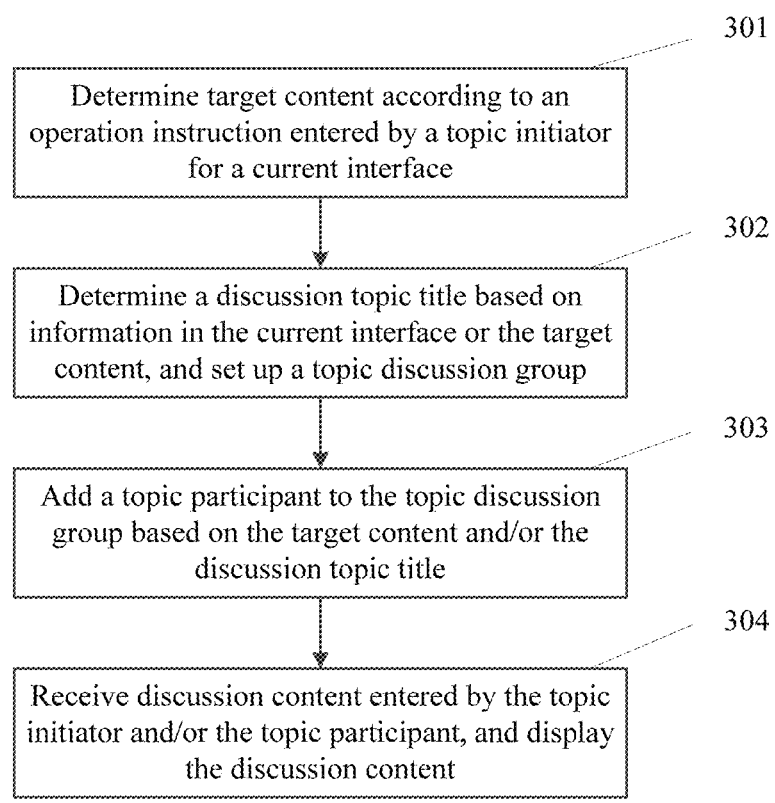
FIG. 3 is an embodiment diagram of an information exchange method according to an embodiment of this application.

1. A topic initiator initiates a topic discussion. FIG. 3 is an embodiment diagram of an information exchange method according to an embodiment of this application. The method may include the following operations.

301: Determine target content in a current interface according to an operation instruction entered by a topic initiator for the current interface.

The current interface is an interface displayed on a display or a touchscreen of a terminal. The interface may be a web interface, or may be another interface with character content. An operation on the interface is converted by an input device into an operation instruction, which is input into the terminal. The operation may be a screen capturing operation or a selection operation such as a gesture or a tap. Partial content in the current interface may be selected through these operations, and the partial content is used as the target content.

Figure 4A:
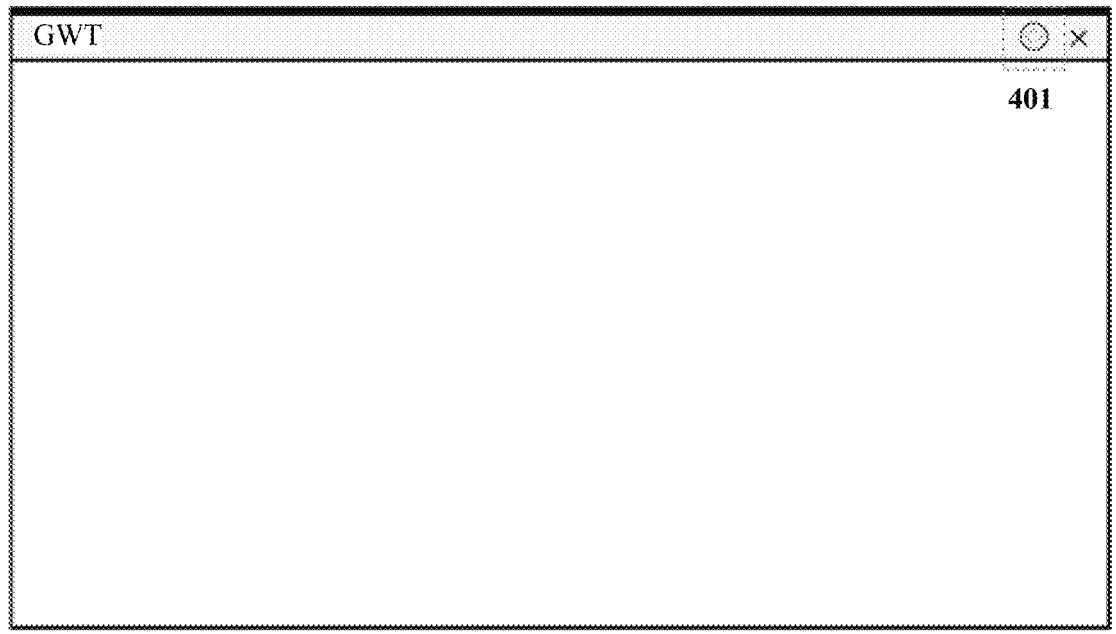
FIG. 4a is an embodiment diagram of an information exchange method according to an embodiment of this application.
Figure 4B:
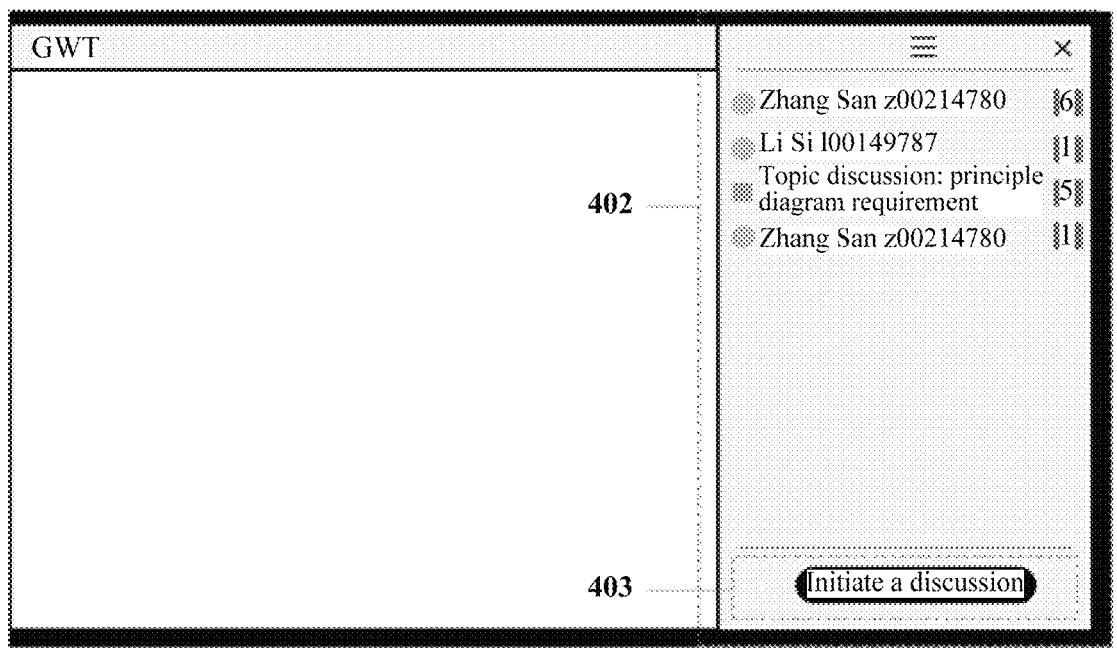
FIG. 4b is an embodiment diagram of an information exchange method according to an embodiment of this application.
Figure 4C:
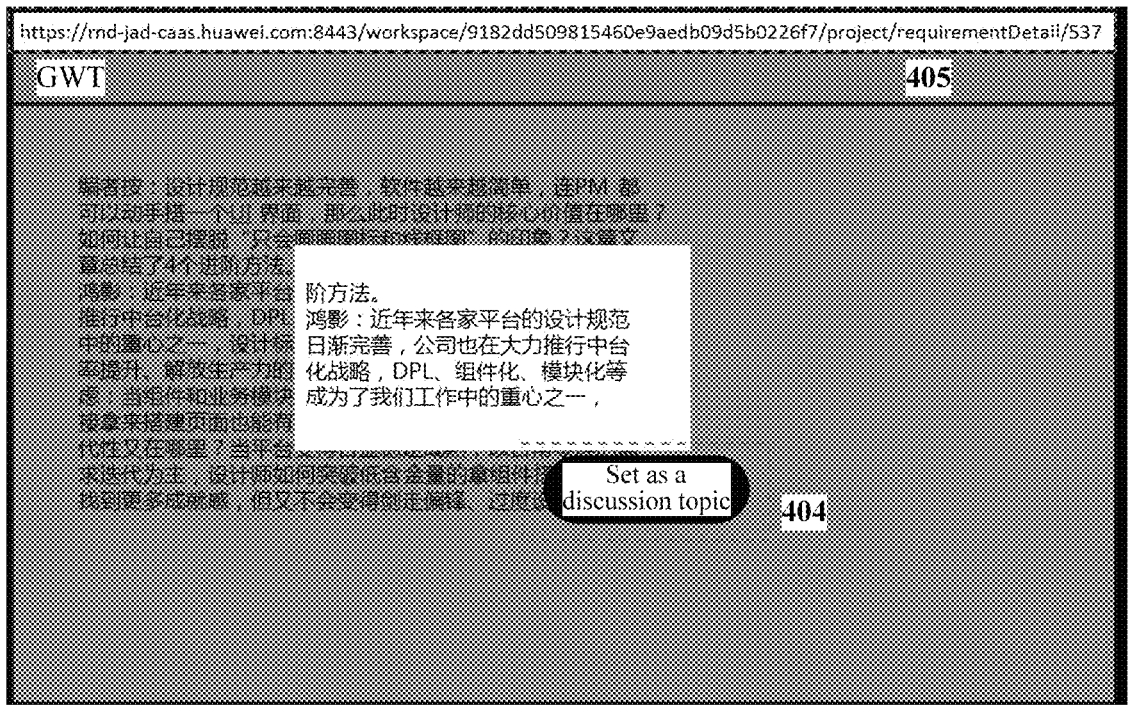
FIG. 4c is an embodiment diagram of an information exchange method according to an embodiment of this application.

The following uses a social discussion tool that is used for a topic discussion as an example to describe a topic initiation operation. Refer to FIG. 4a to FIG. 4c. FIG. 4a is an embodiment diagram of an information exchange method according to an embodiment of this application, FIG. 4b is an embodiment diagram of an information exchange method according to an embodiment of this application, and FIG. 4c is an embodiment diagram of an information exchange method according to an embodiment of this application.

For example, the social discussion tool that is used for a topic discussion of a topic discussion group is first started. A form of the social discussion tool is not limited only to a separate application program, or the social discussion tool may be in a form of a subprogram or plug-in of another application program. From a perspective of a category, the social discussion tool may be a local application program or plug-in, or may be a network application program or plug-in. The social discussion tool may be started in a plurality of manners. A starting manner varies for different terminals. For example, to enter the social discussion tool, a click is performed on a PC device by using a mouse, and a touchscreen is tapped or a touch gesture is performed on an intelligent terminal. An interface of the social discussion tool may be shown in FIG. 4a. An area 401 of the social discussion tool is tapped to enter a main interface 402 of the discussion tool. A button 403 of a discussion initiation function in the main interface 402 is tapped to enter an interface capturing mode. In this mode, a screen capturing area may be determined by performing dragging continuously in the interface by using a mouse or a touch operation, and a "set as a discussion topic" button 404 is tapped to determine content in the screen capturing area as target content.

302: Determine a discussion topic title based on the target content, and set up a topic discussion group.

After the target content is determined, the discussion topic title needs to be determined, and the topic discussion group needs to be set up. Due to existence of the target content, the corresponding discussion topic title can be determined through processing of the target content or recognition of information in the current interface. When the discussion topic title is created, the topic discussion group may be set up.

For example, in FIG. 4c, after the "set as a discussion topic" button 404 is tapped, an information processing service module at a service serving layer in the social discussion tool responds to the tapping operation and generates a discussion topic ID. The discussion topic ID may be a randomly generated 8-digit character string. The topic ID is associated with a topic initiator ID. A purpose of the association is to facilitate a topic initiator to easily find the discussion topic subsequently. A topic participant can also find the discussion topic through the topic initiator, and certainly, can also find, through a topic discussion group, the discussion topic initiated by the topic initiator. When the discussion topic ID is generated, a discussion topic title is also generated based on the target content. There is a plurality of manners of generating the discussion topic title. A first manner may be directly increasing a value of a number in an existing discussion topic title. If a data serving end has stored a "topic discussion 1", a "topic discussion 2" is generated. In a second manner, after the target content is obtained through screen capturing, the target content may be recognized, to obtain the discussion topic title. First, the target content is recognized. In other words, content in an image is recognized as a character string, and then character strings stored in the data serving end are searched for a keyword corresponding to the character string. Content shown in FIG. 4c is still used for description. First, keywords such as "design specification", "component", and "module" are recognized, and then corresponding to these keywords, a corresponding discussion title is generated, for example, "discussion on how to consider design normalization". In a third manner, a network address of the current interface may be obtained based on information in the current interface, for example, when the current interface is a web interface. Then, a feature field is searched for in the network address, and a scenario keyword is determined based on the feature field.

For example, if an obtained network address is "https:// rnd-jad-caas. huawei.com:8443/workspace/ 9182dd509815460e9aedb09d5b0226f7/project/requirement Design/537", feature fields such as "jad", "project", and "requirement" can be obtained from the network address. Based on these feature fields, corresponding keywords such as "design discussion", "requirement analysis", "requirement design", "test management", "instance design", and "environment management" may be found. In this way, a discussion topic title may be generated based on the keywords, for example, "requirement analysis discussion".

It should be noted that there is further a hyperlink area in the interface of the social discussion tool. When a network address is obtained, the network address is stored in the hyperlink area, so that a member of a topic discussion group views, through hyperlink, a current interface in which a topic discussion is initiated.

303: Add a topic participant to the topic discussion group based on the target content and/or the discussion topic title.

It can be learned that after the discussion topic title is generated and the topic discussion group is set up, the topic participant needs to be added to the topic discussion group. In this embodiment of this application, a topic discussion party is added mainly based on the target content and/or the discussion topic title, and a corresponding topic participant is selected to participate in the topic discussion group. During this process, a logical processing service module matches the following content with all associated groups of the topic initiator: the target content and each scenario keyword that is generated when the discussion topic title is generated based on the target content, or the target content and the discussion topic title itself, or certainly the topic discussion title itself. If a matching group is found, a member in the group is added to the generated topic discussion group as a topic participant.

For example, the third manner in a description of operation 302 is still used for description. After the scenario keywords such as "design discussion", "requirement analysis", "requirement design", "test management", "instance design" and "environment management" are obtained, a group that matches both the topic initiator ID and these scenario keywords is searched for in the data serving end. If a matching group is found, a member in the group is added to the topic discussion group as a topic participant.

It should be noted that after adding the topic participant, the topic initiator may further increase or decrease a quantity of members in the topic discussion group. There is a plurality of addition manners. For example, a member in a group associated with the topic initiator may be directly selected to participate in the topic discussion group, or a friend of the topic participant may be selected to participate in the topic discussion group, or a topic participant ID is entered to search for a topic participant, and the topic participant is added to the topic discussion group. To decrease a quantity of topic participants, a member may be directly deleted from the topic discussion group.

For another example, if a current interface to be recognized is not a web interface but a mail tool interface or a WORD office interface. For example, for a mail interface, during adding of a member of a topic discussion group, a mail sender, a mail receiver, a carbon copy recipient, and the like in the mail interface may be directly recognized and added to a topic discussion group. Certainly, content of a mail body may be further recognized, a scenario keyword may be obtained in the foregoing manner, and more topic participants may be added based on the scenario keyword. For another example, when the interface is the WORD office interface, an author, a modifier, an editor, and the like recorded in a current WORD file may be recognized and added to a topic discussion group as topic participants. Certainly, a body of the WORD file may be further recognized, a scenario keyword may be obtained in the foregoing manner, and more topic participants may be added based on the scenario keyword.

304: Receive discussion content entered by the topic initiator and/or the topic participant, and display the discussion content.

After the topic discussion group is generated and the topic participant is added, a topic discussion may be performed. The social discussion tool receives the discussion content entered by the topic initiator and/or the topic participant. The discussion content is not limited to text, and may include rich media content, that is, content such as two-dimensional and three-dimensional animations, images, and sounds. The content enriches topic discussion content. In this operation, an input module in FIG. 2 mainly responds to a user instruction, and a display module displays the entered discussion content. In this process, an information processing service module calls a local data service to buffer the discussion content and information about a content sender to a local disk, so that the discussion content can be viewed later.

It should be noted that after the discussion content is entered, the information processing module reads a discussion topic ID and the topic participant and the topic initiator in the topic discussion group, and sends the entered discussion content to the topic participant and the topic initiator in the topic discussion group. Certainly, if a topic participant or the topic initiator in the topic discussion group is in an offline state during a discussion, a message queue service module stores discussion content in a message queue in a form of an offline message, so that when an offline member goes online, the message queue service sends the discussion content stored in the message queue to the member as an offline message.

It should be noted that the topic initiator ID may be further associated with a favorites list, and the favorites list stores the topic discussion group or discussion content entered by a topic participant in the topic discussion group. It can be learned that for a topic participant that participates in a plurality of topic discussion groups or for a topic initiator, an interested topic or an interested member in a topic discussion group may be collected in the favorites list, so that a topic participant in these topic discussion groups or a topic discussion group obtains a content update prompt after sending discussion content, and certainly, the topic initiator can also quickly locate an interested topic discussion group or topic participant.

It can be learned that during topic initiation performed in a manner shown in FIG. 3, complex topic initiation setting is not required and it is only required that an operation be performed on the current interface to obtain the target content in the current interface, for example, obtaining the target content in a screen capturing manner shown in FIG. 4*c*; the discussion topic title can be determined based on the target content, and the topic discussion group can be set up without requiring a complex process of setting up a topic discussion group; and in addition, during adding of a topic participant, a corresponding topic participant is added based on the target content and/or the discussion topic title. Both an entire topic initiation process and a member addition process are automatically performed by the social discussion tool, except that screen capturing needs to be performed by the topic initiator. Therefore, efficiency in generating a topic discussion group is high, real-time performance of a topic discussion is high, and an operation is easy to perform.

Figure 5:
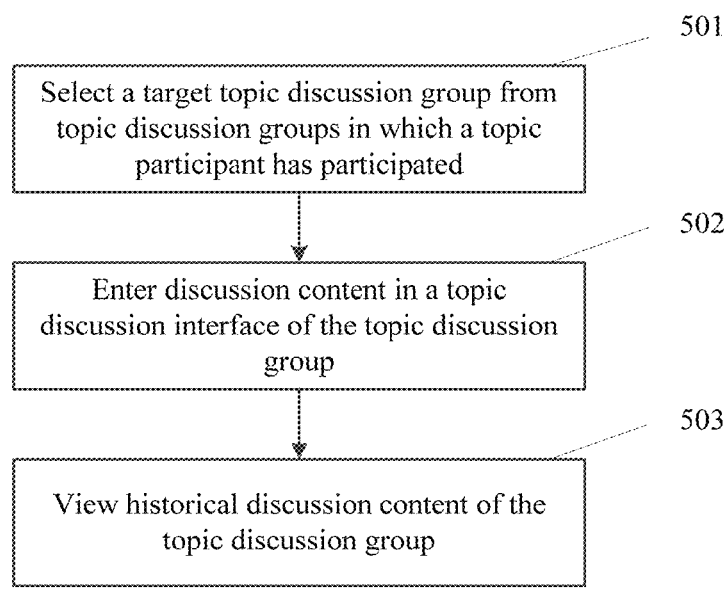
FIG. 5 is an embodiment diagram of an information exchange method according to an embodiment of this application.

2. A topic participant participates in a topic discussion. The foregoing describes a process of setting up a topic discussion group. The following describes a process of viewing and participating in a topic discussion group. FIG. 5 is an embodiment diagram of an information exchange method according to an embodiment of this application. The method may include the following operations.

501: Select a target topic discussion group from topic discussion groups in which a topic participant has participated.

The topic discussion group is set up by a topic initiator after the topic initiator determines a discussion topic title based on information or target content in an interface in which the topic initiator initiates a topic discussion. The interface is an interface displayed on a display or a touchscreen of a terminal. The interface may be a web interface, or may be another interface with character content. The target content in the interface is determined by a social discussion tool according to an entered operation instruction for the interface. Specifically, an operation on the interface is converted by an input device into an operation instruction, which is input into the terminal. The operation may be a screen capturing operation or a selection operation such as a gesture or a tap. Partial content in the current interface may be selected through these operations, and the partial content is used as the target content.

Figure 6A:
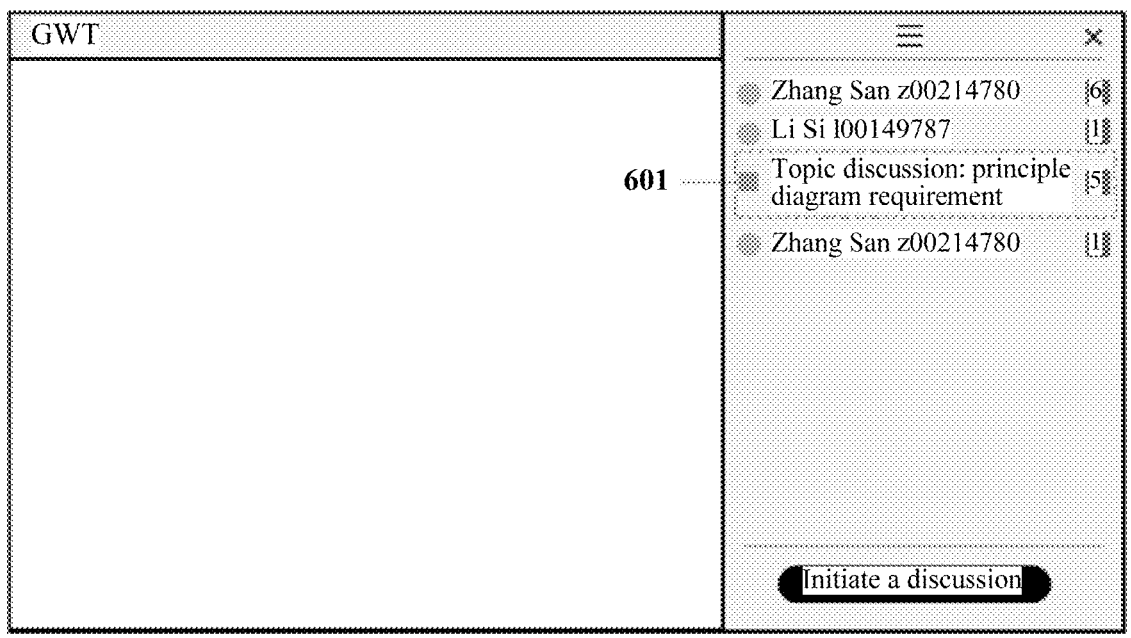
FIG. 6a is an embodiment diagram of an information exchange method according to an embodiment of this application.
Figure 6B:
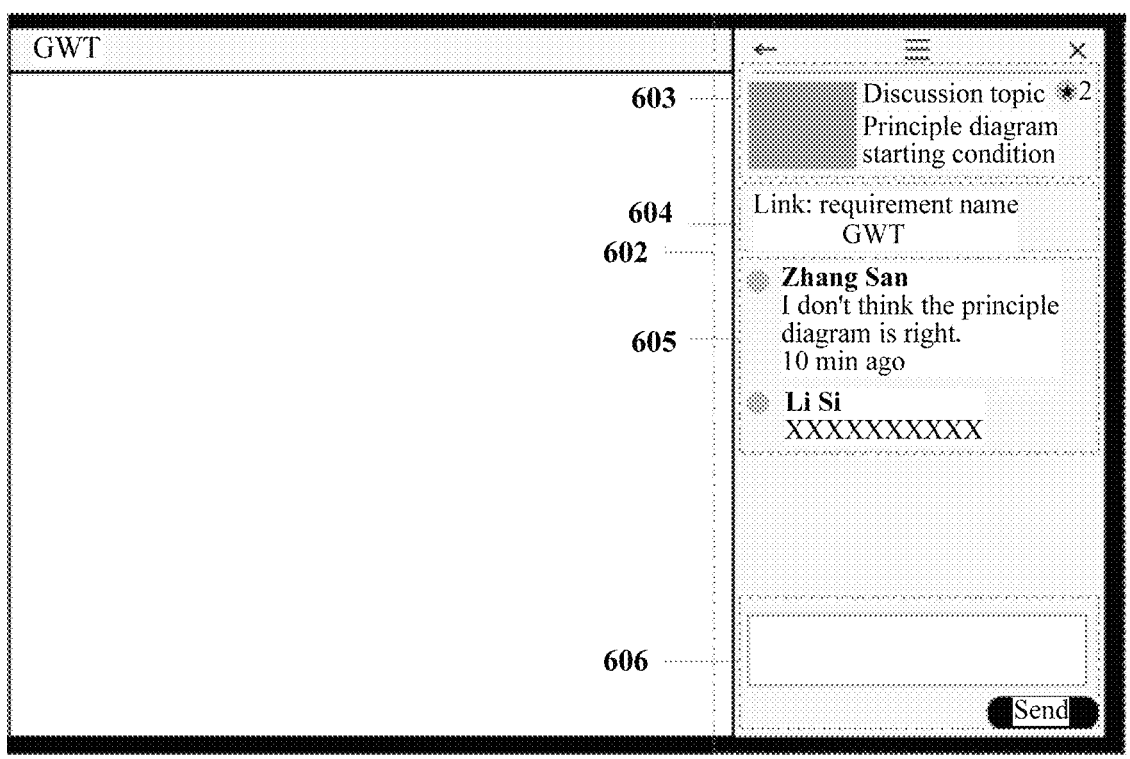
FIG. 6b is an embodiment diagram of an information exchange method according to an embodiment of this application.
Figure 6C:
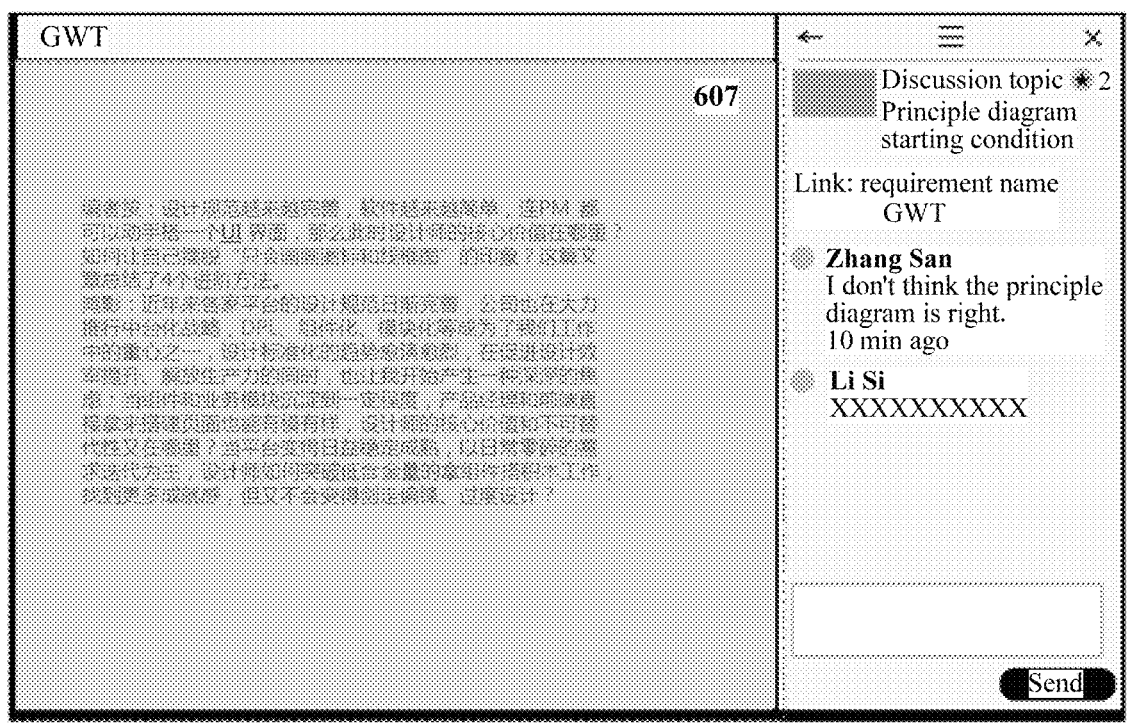
FIG. 6c is an embodiment diagram of an information exchange method according to an embodiment of this application.

The following still uses a social discussion tool as an example to describe a process in which a topic participant participates in a topic discussion. Refer to FIG. 6*a* to FIG. 6*c*. FIG. 6*a* is an embodiment diagram of an information exchange method according to an embodiment of this application, FIG. 6*b* is an embodiment diagram of an information exchange method according to an embodiment of this application, and FIG. 6*c* is an embodiment diagram of an information exchange method according to an embodiment of this application.

For example, the topic participant first starts the social discussion tool. A form of the social discussion tool is not limited only to a separate application program, or the social discussion tool may be in a form of a subprogram or plug-in of another application program. From a perspective of a category, the social discussion tool may be a local application program or plug-in, or may be a network application program or plug-in. After starting the social discussion tool, the topic participant can enter a main interface of the discussion tool in a manner shown in FIG. 4*a*, and details are not described herein again. After entering the main interface, the topic participant sees, in the main interface, a topic discussion group in which the topic participant has participated and that is shown in FIG. 6*a* (for example, 601 in FIG. 6*a* shows a topic discussion group in which the topic participant has participated) and latest dynamic information of a member in the topic discussion group. The topic participant may select one from the topic discussion groups in which the topic participant has participated to enter the topic discussion group, or may tap a member in a topic discussion group to enter the corresponding topic discussion group. After the topic participant enters the topic discussion group, the main interface jumps to a topic discussion group details interface, as shown by an area 602 in FIG. 6*b*. The topic discussion group details interface mainly includes four parts. A first part is a topic discussion profile area, as shown by an area 603 in FIG. 6*b*, which mainly displays content such as a discussion screenshot, a topic title, a group member, and a favorite topic. A second part is a hyperlink area, as shown by an area 604 in FIG. 6*b*, which is mainly used to display target content associated with the discussion topic (content generated through screen capturing is used as an example) and a hypertext link. The hypertext link is a network address in a description of operation 302 in the embodiment shown in FIG. 3. If an interface in which screen capturing is performed is a web interface, the hypertext link is corresponding to the interface in which screen capturing is performed. The interface can be displayed after the hypertext link is tapped. A third part is a content presentation area, as shown by an area 605 in FIG. 6*b*, which is mainly used to display a content list of a discussion performed by members in the topic discussion group. In other words, all discussion content of all the members in the topic discussion group is displayed in the content list. It should be noted that due to a limited range of the area, this area preferentially displays discussion content recently sent. The topic participant may view previous discussion content by selecting the area and scrolling a mouse or sliding a touchscreen upwards. A fourth part is a topic discussion editing area, as shown by an area 606 in FIG. 6*b*. The topic participant may enter and send discussion content about a topic in the area.

It should be noted that when the hypertext link in the area 604 in FIG. 6*b* is tapped, as shown in FIG. 6*c*, an interface used by a topic initiator for screen capturing when the topic initiator initiates the topic discussion is displayed in an area 607 in the interface of the social discussion tool, so that the topic participant can learn of and view a background of the topic discussion in detail through content in the interface. During this process, an input module in the social discussion tool first recognizes, when the area 604 in FIG. 6*b* is tapped, an instruction of viewing a hypertext link. Then, an information processing service module requests a data serving end to query an ID of the topic discussion. Then, the information processing service module receives a URL field that is corresponding to the queried ID of the topic discussion and that is stored by the data serving end. Then, after obtaining the URL field, the information processing service module calls a web browser function to obtain content in a web page corresponding to the URL field, and then displays the content in the area 607 shown in FIG. 6*c*.

502: Enter discussion content in a topic discussion interface of the topic discussion group.

After the topic discussion group is selected, discussion content about a topic may be entered and sent in the area 606 in FIG. 6*b*. After being sent, the discussion content is displayed in the area 605 in FIG. 6*b*, and a service serving layer in the embodiment shown in FIG. 2 synchronously sends the discussion content to another member in the topic discussion group.

503: View historical discussion content of the topic discussion group.

In addition to performing a topic discussion by using operation 502, the topic participant may view the historical discussion content of the topic discussion group. There is a plurality of viewing manners. In a manner, the topic participant may view the historical discussion content by selecting the area 605 in FIG. 6*b* and scrolling a mouse or sliding a touchscreen upwards. Certainly, the topic participant may alternatively enter a separate message manager of the topic discussion group and view the historical discussion content in the message manager. In the message manager, the topic participant may further view the historical discussion content by using different search rules. For example, if the topic participant is relatively interested in content published by a member in the topic discussion group, all the historical discussion content of the topic discussion group may be searched by using a name of the member as a search keyword, and all discussion content sent by the member is displayed.

It can be learned that when participating in the topic discussion, the topic participant directly chooses, in the main interface of the discussion tool, to enter one of the topic discussion groups in which the topic participant has participated, and an interface of the topic discussion group includes four parts, namely, the topic discussion profile area, the hyperlink area, the content presentation area, and the topic discussion editing area. Through appropriate arrangement of functions of the four areas, the topic participant can quickly learn of the topic initiation background and the historical discussion content and latest discussion content of the topic discussion, and therefore can quickly participate in the topic discussion in real time.

Figure 7A:
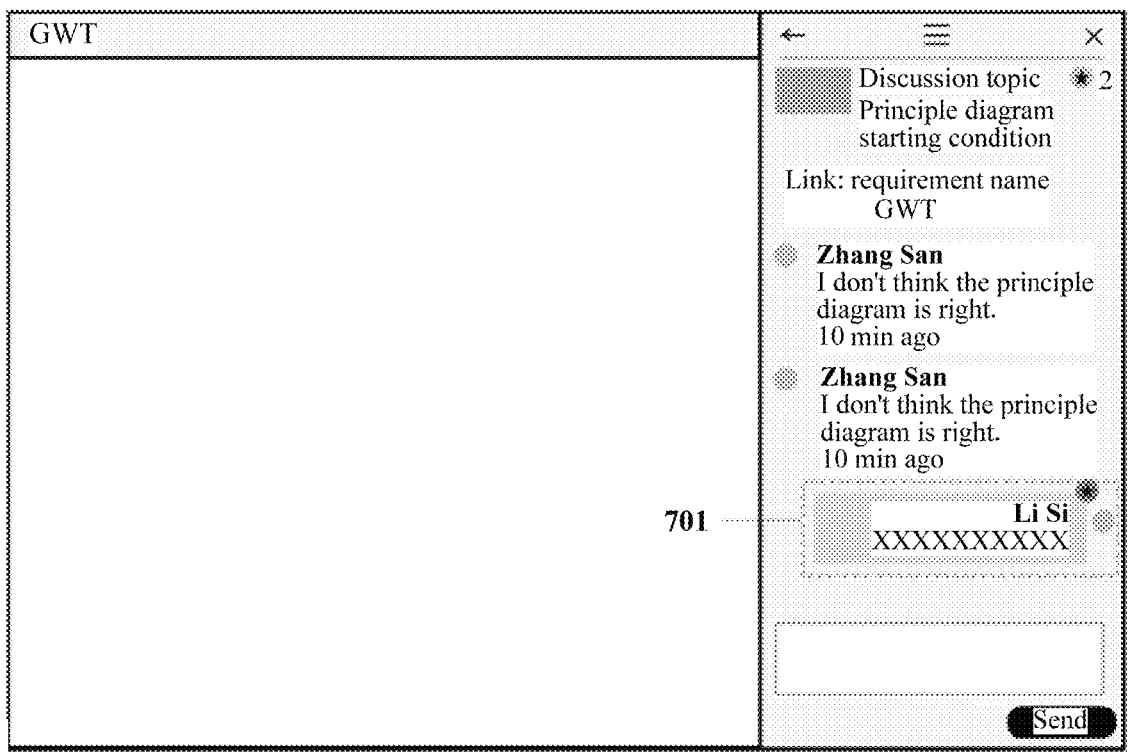
FIG. 7a is an embodiment diagram of an information exchange method according to an embodiment of this application.
Figure 7B:
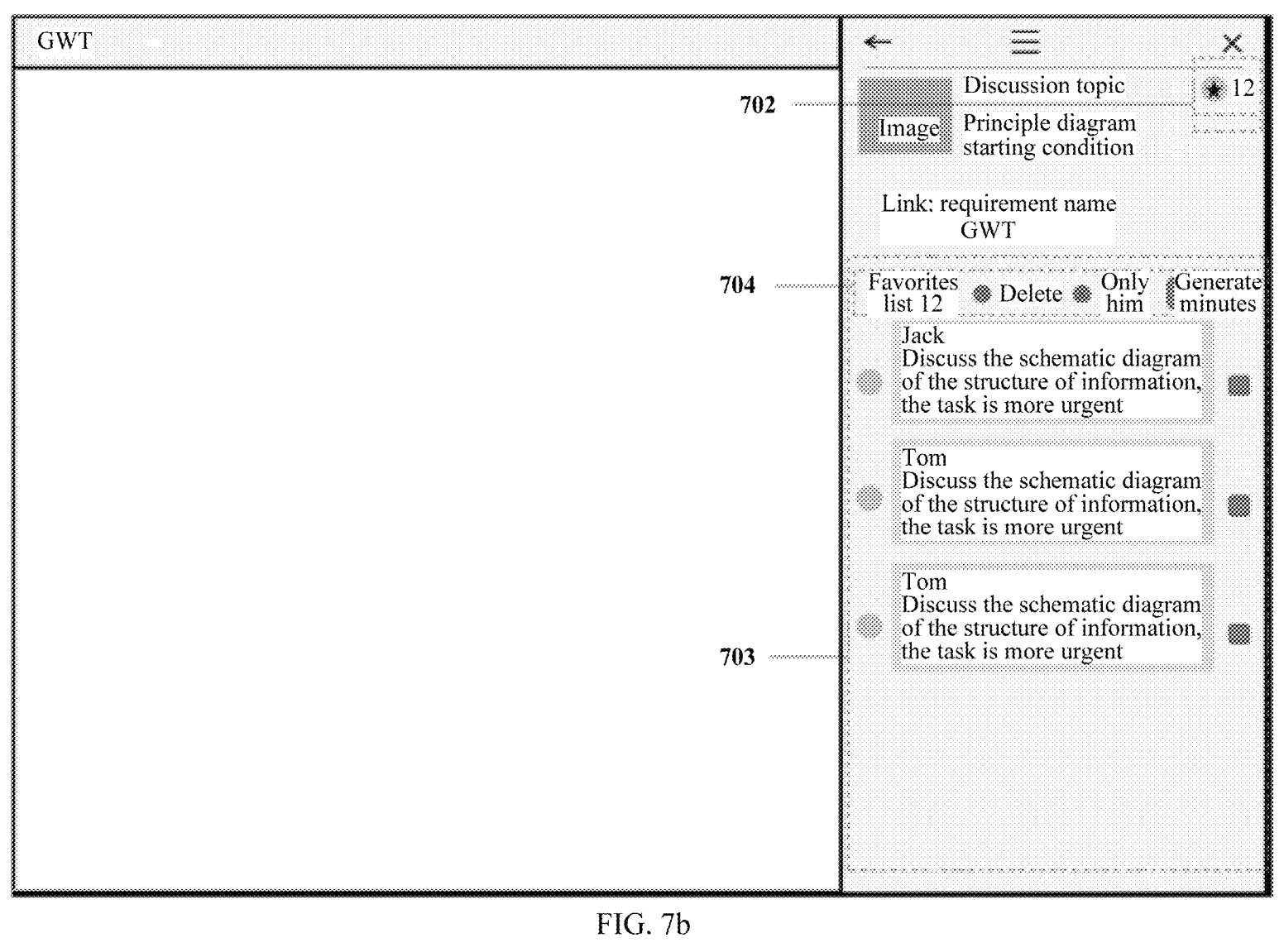

The foregoing describes the following phases in the information exchange method in the embodiments of this application: a phase in which the topic initiator sets up the topic discussion group and a phase in which the topic participant participates in the topic discussion. The following describes another function of the topic discussion group in the information exchange method in this application. As shown in FIG. 7*a* and FIG. 7*b*, FIG. 7*a* is an embodiment diagram of an information exchange method according to an embodiment of this application, and FIG. 7*b* is an embodiment diagram of an information exchange method according to an embodiment of this application. FIG. 7*a* and FIG. 7*b* show a process of collecting content in a topic discussion group and viewing and modifying a collection during topic discussion participation, as described below.

First, a topic initiator or a topic participant enters a topic discussion tool as a user of the topic discussion tool by performing an operation in a web interface, selects a related topic discussion group in an interface of the discussion tool, and enters a topic discussion group details interface of the topic discussion group. For the selection and entering processes, refer to a description of operation 501 in the embodiment shown in FIG. 5, and details are not described herein again. In the topic discussion group details interface, topic discussion content of any member in a content presentation area may be selected, for example, a piece of discussion content of a member named "Li Si" in an area 701 shown in FIG. 7*a*. After the content is tapped, a favorites button is displayed, for example, a button at an upper right corner in the area 701. After the button is tapped, the piece of discussion content is collected. Similarly, a favorites button is also configured at an upper right corner in a topic discussion profile area, as shown by an area 702 in FIG. 7*b*. When the favorites button is tapped, a favorites list is displayed, as shown by an area 703 in FIG. 7*b*. The favorites list is located below a hyperlink area and covers the content presentation area and a topic discussion editing area in the topic discussion group details interface. In an area 704 in the area 703 in FIG. 7b, functions such as selecting, editing, hiding, and deleting are included. When all or a part of list content is selected from the favorites list, a favorites content list may be operated by using a function button in the area 704.

For example, a topic participant is selected, and all discussion content of the topic participant is ticked, as shown in the area 703. If a check box after a member is checked, this piece of discussion content is selected as an alternative part of meeting minutes content by default. When a "set as minutes" button in the area 704 is tapped, the selected content is used as the minutes content. Then, the minutes content may be sent to each member in the topic discussion group. In addition, key discussion content may be further manually recognized, and minutes are generated and sent to a specified member or all participating members. In addition, a topic initiator may hide and delete all topic discussion content of a member in a topic discussion group. In the meeting minutes preparation process, after an input module receives an operation instruction of preparing meeting minutes that is sent by the topic initiator, an information processing service module sends a query request to a data serving end. The data serving end filters discussion content of the topic by using a favorite message ID. A logical processing service module extracts information from message content filtered out by the data serving end. A display module displays the extracted information in the interface. In this way, the discussion content is collected.

In addition, after the minutes are generated, a sender may be further specified, and the minutes may be automatically sent to all members of the topic discussion group by a mail sending system. Before a mail is sent, a sender may manually edit and process the favorites list by using a function button in the area 704. For example, only discussion content of a topic discussion participating member is viewed. Certainly, a discussion record of a person may be deleted. Not only the minutes are sent to all the members, but also a member whose minutes are to be sent or the minutes content itself may be filtered. In other words, only discussion content of a member may be selected to be sent as the minutes content. For example, only discussion content of a topic discussion initiator is sent. For another example, the minutes are sent only to some selected members of the topic discussion group.

Figure 8:
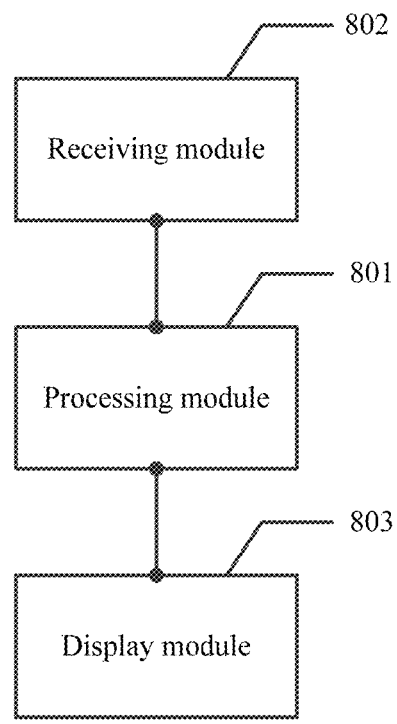
FIG. 8 is an embodiment diagram of a terminal according to an embodiment of this application.

The foregoing describes the information exchange method in the embodiments of this application. The following describes a terminal in embodiments of this application. FIG. 8 is an embodiment diagram of a terminal according to an embodiment of this application. The terminal may include:

a processing module 801, configured to determine target content in a current interface according to an operation instruction entered by a topic initiator for the current interface, where the processing module 801 determines a discussion topic title based on the target content, and sets up a topic discussion group; and the processing module 801 adds a topic participant to the topic discussion group based on the target content and/or the discussion topic title; a receiving module 802, configured to receive discussion content entered by the topic initiator and/or the topic participant; and a display module 803, configured to display the discussion content.

It can be learned that during topic initiation, complex topic initiation setting is not required, and it is only required that the processing module 801 perform an operation on the current interface to obtain the target content in the current interface; the processing module 801 can determine the discussion topic title based on the target content, and set up the topic discussion group without requiring a complex process of setting up a topic discussion group; and in addition, when adding a topic participant, the processing module 801 adds a corresponding topic participant based on the target content and/or the discussion topic title. Both the generation process and a member addition process are automatically performed by a topic discussion system. Therefore, efficiency in generating a topic discussion group is high, real-time performance of a topic discussion is high, and an operation is easy to perform.

In one embodiment, the processing module 801 may determine, according to the operation instruction, to capture a part of the current interface; and perform content recognition on the captured part of the current interface to obtain the target content. The processing module 801 captures a part of the current interface directly according to the operation instruction, and after performing screen capturing, performs content recognition on the captured part, so as to obtain the target content. This manner is easy to operate, and it is convenient to initiate a topic discussion. For a specific screen capturing manner, refer to FIG. 4c and a related description, and details are not described herein again.

In one embodiment, the current interface is a network web interface, and the processing module 801 may obtain a network address of a web interface corresponding to the target content; and when determining that the network address includes a preset first keyword, determine the discussion topic title based on the first keyword. For a specific manner of determining the topic discussion title based on the network address, refer to FIG. 4c and a related description, and details are not described herein again.

In one embodiment, a hyperlink area is configured in a topic discussion interface of the topic discussion group, the processing module 801 may store the network address in the topic discussion group, and the display module is further configured to display the network address in the hyperlink area of the topic discussion group. For a specific setting of the topic discussion interface, refer to FIG. 6b and a related description, and details are not described herein again.

In one embodiment, the processing module 801 may determine a second keyword based on the target content; search for a historical topic discussion group in which the topic initiator has participated; and when the historical topic discussion group has content corresponding to the second keyword, add a topic participant in the historical topic discussion group to the topic discussion group. For a specific process of adding the topic participant, refer to a description of operation 303 in the embodiment shown in FIG. 3, and details are not described herein again.

In one embodiment, the processing module 801 may determine a corresponding third keyword based on the discussion topic title; search for a historical topic discussion group in which the topic initiator has participated; and when the historical topic discussion group has content corresponding to the third keyword, add a topic participant in the historical topic discussion group to the topic discussion group. For a specific process of adding the topic participant, refer to a description of operation 303 in the embodiment shown in FIG. 3, and details are not described herein again.

In one embodiment, the processing module 801 may determine a second keyword based on the target content, and determine a corresponding third keyword based on the discussion topic title; search for a historical topic discussion group in which the topic initiator has participated; and when the historical topic discussion group has content corresponding to the third keyword or the second keyword, add, to the topic discussion group, each topic participant in the historical topic discussion group that has the content corresponding to the third keyword or the second keyword. For a specific process of adding the topic participant, refer to a description of operation 303 in the embodiment shown in FIG. 3, and details are not described herein again.

In one embodiment, a content presentation area used for displaying the discussion content is configured in the topic discussion interface of the topic discussion group, a message queue used for storing the discussion content is further configured for the topic discussion group correspondingly, and the processing module 801 may further perform modification on a topic participant in the topic discussion group; and when there is a newly added topic participant in the modified topic discussion group, views, for the newly added topic participant, discussion content in the message queue in the content presentation area. For information about the content presentation area, refer to FIG. 6b and a related description, and details are not described herein again.

In one embodiment, the processing module 801 may be further configured to: when the discussion content in the message queue is updated, send a content update prompt to the topic initiator and the topic participant in the topic discussion group. This setting enables each member in the topic discussion group to learn of latest discussion content in a timely manner.

In one embodiment, the topic discussion group is further corresponding to a topic discussion group ID, the topic initiator is further corresponding to a topic initiator ID, the topic discussion group ID is associated with the topic initiator ID, the topic initiator ID is further associated with a favorites list, the topic initiator ID is obtained through recognition of the topic initiator, the topic discussion group ID is generated when the topic discussion group is generated, and the processing module 801 may be further configured to: add, to the favorites list, the topic discussion group or discussion content entered by a topic participant in the topic discussion group. For a presentation manner of the favorites list, refer to FIG. 7b and a related description, and details are not described herein again.

Figure 9:
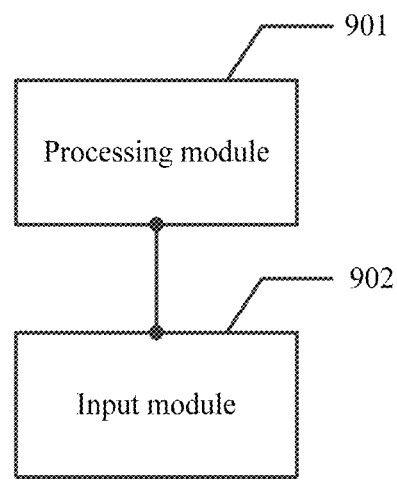
FIG. 9 is an embodiment diagram of a terminal according to an embodiment of this application.

The foregoing describes the terminal in the embodiments of this application. The following describes another form of the terminal in the embodiments of this application. FIG. 9 is an embodiment diagram of a terminal according to an embodiment of this application. The terminal may include:

a processing module 901, configured to select a target topic discussion group from topic discussion groups in which a topic participant has participated, where the topic discussion group is set up by a topic initiator after the topic initiator determines a discussion topic title based on target content in an interface in which the topic initiator initiates the topic discussion; and an input module 902, configured to enter discussion content in a topic discussion interface of the topic discussion group, where the processing module 901 is further configured to view historical discussion content of the topic discussion group.

It can be learned that the topic discussion group is a topic discussion group set up after the topic initiator obtains target content in a current interface by performing an operation on the current interface and generates the discussion topic title based on the target content. Therefore, efficiency in generating the topic discussion group is high, real-time performance of a topic discussion is high, an operation is easy to perform, and it is also very convenient for the topic participant to participate in the topic discussion group.

In one embodiment, the topic discussion interface includes a topic discussion profile area, the topic discussion profile area includes topic participants, the target content, and the discussion topic title that are of the topic discussion group, and the processing module 901 may select the target content in the topic discussion profile area, and display the target content; or select any topic participant of the topic participants, and display discussion content entered by the topic participant. For information about the topic discussion profile area, refer to FIG. 6b and a related description, and details are not described herein again.

In one embodiment, the topic discussion interface includes a content presentation area, a message queue used for storing the discussion content is further configured for the topic discussion group correspondingly, and the processing module 901 may further view discussion content in the message queue in the content presentation area. For information about the content presentation area, refer to FIG. 6b and a related description, and details are not described herein again.

In one embodiment, the processing module 901 is further configured to: when the discussion content in the message queue is updated, send a content update prompt to the topic initiator and the topic participants in the topic discussion group, so that the topic initiator and the topic participants in the topic discussion group can learn of latest discussion content in a timely manner.

In one embodiment, the topic discussion interface includes a hyperlink area, and the processing module 901 may further select the hyperlink area to display an interface corresponding to a hyperlink in the hyperlink area. For information about the hyperlink area, refer to FIG. 6c and a related description, and details are not described herein again.

In one embodiment, the topic discussion group is further corresponding to a topic discussion group ID, the topic participant is further corresponding to a topic participant ID, the topic participant ID is further associated with a favorites list, the favorites list stores a topic discussion group, or discussion content entered by a topic participant in the topic discussion group, and the processing module 901 may further select the topic discussion group or a topic participant in the topic discussion group from the favorites list, and view discussion content of the topic discussion group or discussion content of the topic participant in the topic discussion group. For a presentation manner of the favorites list, refer to FIG. 7b and a related description, and details are not described herein again.

Figure 10:
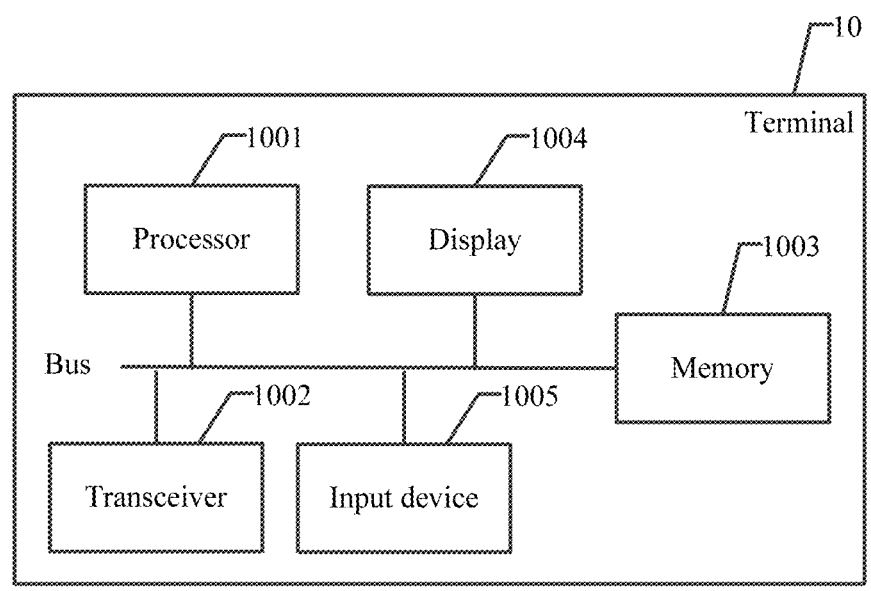
FIG. 10 is an embodiment diagram of a terminal according to an embodiment of this application.

The following describes a structure of the terminal in the embodiments of this application. FIG. 10 is an embodiment diagram of a terminal according to an embodiment of this application. A terminal 10 may include at least one processor 1001, at least one transceiver 1002, at least one memory 1003, at least one display 1004, and an input device 1005 that are all connected to a bus. The terminal in the embodiments of this application may include components more or fewer than those shown in FIG. 10, may include a combination of two or more components, or may include components configured or disposed differently. Each component may be implemented in hardware that includes one or more signal processing and/or application-specific integrated circuits, in software, or in a combination of the hardware and the software.

Specifically, for the embodiment shown in FIG. 8, the processor 1001 can perform a function of the processing module 801 of the terminal in the embodiment shown in FIG. 8, and the transceiver 1002 can perform a function of the receiving module 802 of the terminal in the embodiment shown in FIG. 8. The transceiver 1002 may be further configured to perform information exchange between a terminal and a server. The memory 1003 has a plurality of structures, and is configured to store a program instruction. The processor 1001 is configured to execute the instruction in the memory 1003, to perform the information exchange method in the embodiment shown in FIG. 3. The display 1004 can perform a function of the display module 803 of the terminal in the embodiment shown in FIG. 8. The input device 1005 may be configured to enter discussion content to a terminal by a user.

Specifically, for the embodiment shown in FIG. 9, the processor 1001 can perform a function of the processing module 901 of the terminal in the embodiment shown in FIG. 9. The transceiver 1002 may be configured to perform information exchange between a terminal and a server. The memory 1003 has a plurality of structures, and is configured to store a program instruction. The processor 1001 is configured to execute the instruction in the memory 1003, to perform the information exchange method in the embodiment shown in FIG. 5. The display 1004 may be configured to display a topic discussion interface. The input device 1005 can perform a function of the input module 902 of the terminal in the embodiment shown in FIG. 9.

All or some of the foregoing embodiments may be implemented through software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

In conclusion, the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An information exchange method, comprising:
    determining target content in a current interface according to an operation instruction entered by a topic initiator for the current interface, the topic initiator associated with a topic initiator ID;
    determining a discussion topic title based on the target content, and setting up a topic discussion group that corresponds to a topic discussion ID associated with the topic initiator ID, wherein the topic initiator ID is further associated with a favorites list;
    adding a topic participant to the topic discussion group based on one of the target content or the discussion topic title; and
    receiving discussion content entered by one of the topic initiator or the topic participant, and displaying the discussion content.

2. The information exchange method according to claim 1, wherein determining the target content in the current interface according to the operation instruction entered by the topic initiator for the current interface comprises:
    determining, according to the operation instruction, to capture a part of the current interface; and
    performing content recognition on the captured part of the current interface to obtain the target content.

3. The information exchange method according to claim 1, wherein the current interface is a network web interface, and determining the discussion topic title based on the target content comprises:
    obtaining a network address of a web interface corresponding to the target content; and
    in response to determining that the network address comprises a preset first keyword, determining the discussion topic title based on the first keyword.

4. The information exchange method according to claim 3, wherein a hyperlink area is configured in a topic discussion interface of the topic discussion group, and the method further comprises:
    storing the network address in the topic discussion group, and displaying the network address in the hyperlink area of the topic discussion group.

5. The information exchange method according to claim 1, wherein adding the topic participant to the topic discussion group based on the target content comprises:
    determining a second keyword based on the target content;
    searching for a historical topic discussion group in which the topic initiator has participated; and
    when the historical topic discussion group has content corresponding to the second keyword, adding a topic participant in the historical topic discussion group to the topic discussion group.

6. The information exchange method according to claim 1, wherein adding the topic participant to the topic discussion group based on the discussion topic title comprises:

determining a corresponding third keyword based on the discussion topic title;
searching for a historical topic discussion group in which the topic initiator has participated; and
when the historical topic discussion group has content corresponding to the third keyword, adding a topic participant in the historical topic discussion group to the topic discussion group.

7. The information exchange method according to claim 1, wherein adding the topic participant to the topic discussion group based on the discussion topic title and the target content comprises:
determining a second keyword based on the target content;
determining a corresponding third keyword based on the discussion topic title;
searching for a historical topic discussion group in which the topic initiator has participated; and
when the historical topic discussion group has content corresponding to the second keyword or the third keyword, adding, to the topic discussion group, each topic participant in the historical topic discussion group that has the content corresponding to the second keyword or the third keyword.

8. The information exchange method according to claim 1, wherein a content presentation area used for displaying the discussion content is configured in a topic discussion interface of the topic discussion group, a message queue used for storing the discussion content is further configured for the topic discussion group correspondingly, and the method further comprises:
performing modification on a topic participant in the topic discussion group; and
when there is a newly added topic participant in the modified topic discussion group, viewing, by the newly added topic participant, discussion content in the message queue in the content presentation area.

9. The information exchange method according to claim 8, wherein the method further comprises:
when the discussion content in the message queue is updated, sending a content update prompt to the topic initiator and the topic participant in the topic discussion group.

10. The information exchange method according to claim 1, wherein the topic discussion group ID is generated when the topic discussion group is generated, wherein the topic initiator ID is obtained through recognition of the topic initiator, and wherein the method further comprises:
adding, to the favorites list, the topic discussion group or discussion content entered by a topic participant in the topic discussion group.

11. A terminal, comprising a processor, and a memory that are connected to the processor, the memory storing instructions, which, when executed by the processor, cause the processor to perform operations comprising;
determining target content in a current interface according to an operation instruction entered by a topic initiator for the current interface, the topic initiator associated with a topic initiator ID;
determining a discussion topic title based on the target content, and setting up a topic discussion group that corresponds to a topic discussion ID associated with the topic initiator ID, wherein the topic initiator ID is further associated with a favorites list;
adding a topic participant to the topic discussion group based on one of the target content or the discussion topic title; and receiving discussion content entered by one of the topic initiator or the topic participant, and displaying the discussion content.

12. The terminal according to claim 11, wherein the operations further comprise:
determining, according to the operation instruction, to capture a part of the current interface; and
performing content recognition on the captured part of the current interface to obtain the target content.

13. The terminal according to claim 11, the operations further comprise:
obtaining a network address of a web interface corresponding to the target content; and
In response to determining that the network address comprises a preset first keyword, determining the discussion topic title based on the first keyword.

14. The terminal according to claim 11, the operations further comprise:
determining a second keyword based on the target content;
searching for a historical topic discussion group in which the topic initiator has participated; and
when the historical topic discussion group has content corresponding to the second keyword, adding a topic participant in the historical topic discussion group to the topic discussion group.

15. The terminal according to claim 11, wherein the operations further comprise:
determining a corresponding third keyword based on the discussion topic title;
searching for a historical topic discussion group in which the topic initiator has participated; and
when the historical topic discussion group has content corresponding to the third keyword, adding a topic participant in the historical topic discussion group to the topic discussion group.

16. The terminal according to claim 11, the operations further comprise:
determining a second keyword based on the target content;
determining a corresponding third keyword based on the discussion topic title;
searching for a historical topic discussion group in which the topic initiator has participated; and
when the historical topic discussion group has content corresponding to the second keyword or the third keyword, adding, to the topic discussion group, each topic participant in the historical topic discussion group that has the content corresponding to the second keyword or the third keyword.

17. The terminal according to claim 11, wherein a content presentation area used for displaying the discussion content is configured in a topic discussion interface of the topic discussion group, a message queue used for storing the discussion content is further configured for the topic discussion group correspondingly, and wherein the operations further comprise:
performing modification on a topic participant in the topic discussion group; and
when there is a newly added topic participant in the modified topic discussion group, viewing, by the newly added topic participant, discussion content in the message queue in the content presentation area.

18. The terminal according to claim 11, wherein the topic discussion group ID is generated when the topic discussion group is generated, wherein the topic initiator ID is obtained through recognition of the topic initiator, and wherein the operations further comprise:
- adding, to the favorites list, the topic discussion group or discussion content entered by a topic participant in the topic discussion group.

19. A non-transitory computer readable storage medium, comprising instructions, which, when executed by a computer, cause the computer to perform operations comprising:
- determining target content in a current interface according to an operation instruction entered by a topic initiator for the current interface, the topic initiator associated with a topic initiator ID;
- determining a discussion topic title based on the target content, and setting up a topic discussion group that corresponds to a topic discussion ID associated with the topic initiator ID, wherein the topic initiator ID is further associated with a favorites list;
- adding a topic participant to the topic discussion group based on one of the target content or the discussion topic title; and
- receiving discussion content entered by one of the topic initiator or the topic participant, and displaying the discussion content.

20. The non-transitory computer readable storage medium according to claim 19, wherein the operations further comprise:
- determining, according to the operation instruction, to capture a part of the current interface; and
- performing content recognition on the captured part of the current interface to obtain the target content.

* * * * *